(12) United States Patent
Pantea et al.

(10) Patent No.: US 10,502,648 B1
(45) Date of Patent: Dec. 10, 2019

(54) HIGH-PRESSURE, HIGH-TEMPERATURE HOLLOW SPHERE ACOUSTIC PRESSURE SENSOR

(71) Applicant: LOS ALAMOS NATIONAL SECURITY, LLC, Los Alamos, NM (US)

(72) Inventors: Cristian Pantea, Los Alamos, NM (US); Dipen Sinha, Los Alamos, NM (US); Blake Sturtevant, Los Alamos, NM (US)

(73) Assignee: Triad National Security, LLC, Los Alamons, NM (US)

( * ) Notice: Subject to any disclaimer, the term of this patent is extended or adjusted under 35 U.S.C. 154(b) by 258 days.

(21) Appl. No.: 15/718,996

(22) Filed: Sep. 28, 2017

Related U.S. Application Data

(60) Provisional application No. 62/401,070, filed on Sep. 28, 2016.

(51) Int. Cl.
*G01L 27/00* (2006.01)
*G01L 9/00* (2006.01)

(52) U.S. Cl.
CPC .......... *G01L 9/0025* (2013.01); *G01L 27/005* (2013.01)

(58) Field of Classification Search
CPC ............................ G01L 9/0025; G01L 27/005
See application file for complete search history.

(56) References Cited

U.S. PATENT DOCUMENTS

| | | | | |
|---|---|---|---|---|
| 3,367,169 A | * | 2/1968 | Moore | G01L 27/005 73/1.58 |
| 3,630,071 A | * | 12/1971 | Newhall | G01L 7/16 73/1.65 |
| 4,512,198 A | * | 4/1985 | Sinha | G01L 9/0025 310/313 B |
| 4,534,223 A | * | 8/1985 | Sinha | G01L 9/0025 310/313 B |
| 4,535,631 A | * | 8/1985 | Sinha | G01L 9/0025 310/313 B |
| 4,535,632 A | * | 8/1985 | Sinha | G01L 9/0025 310/313 B |

(Continued)

*Primary Examiner* — David J Bolduc
(74) *Attorney, Agent, or Firm* — Lewis Roce Rothgerber Christie LLP

(57) ABSTRACT

A pressure sensor and a method of measuring pressure with the pressure sensor, based on measuring the effect of pressure loads on the acoustic resonance mode frequencies of a spherical core (e.g., a hollow sphere). The pressure sensor includes a transmitter configured to transmit vibrational signals to a sphere, and a receiver on the opposite side of the spherical core that is configured to receive vibrational signals from the spherical core. According to the method of measuring pressure with this sensor, the spherical core exhibits a pressure-dependent resonance response that can be monitored utilizing a frequency response technique. Peak shifts observed under an unknown pressure load can be compared to a calibration of the spherical core under a series of known pressure loads to thereby determine the unknown pressure. The pressure sensor and method may be operated in real-time at very high temperatures and pressure, and may be used in borehole applications and in aggressive media.

20 Claims, 10 Drawing Sheets
(6 of 10 Drawing Sheet(s) Filed in Color)

(56) References Cited

U.S. PATENT DOCUMENTS

| | | | | |
|---|---|---|---|---|
| 4,586,382 | A * | 5/1986 | Sinha | G01L 9/0025 310/313 B |
| 4,622,855 | A * | 11/1986 | Sinha | G01L 9/0025 310/313 B |
| 9,453,774 | B2 * | 9/2016 | Bao | G01L 7/041 |
| 2007/0186657 | A1 * | 8/2007 | Sato | G01L 9/085 73/708 |
| 2008/0265711 | A1 * | 10/2008 | Kumar | G01L 9/0025 310/313 B |
| 2009/0085441 | A1 * | 4/2009 | Morris | G01L 9/0022 310/338 |
| 2009/0299663 | A1 * | 12/2009 | Butz | G01M 13/045 702/56 |
| 2011/0320142 | A1 * | 12/2011 | Surman | G01L 9/0098 702/50 |
| 2014/0327340 | A1 * | 11/2014 | Tsurumi | G01L 1/16 310/338 |
| 2017/0329356 | A1 * | 11/2017 | McKeon | G01L 9/0025 |
| 2018/0136081 | A1 * | 5/2018 | Lee | G01M 13/04 |

* cited by examiner

HIGH-PRESSURE, HIGH-TEMPERATURE HOLLOW SPHERE ACOUSTIC PRESSURE SENSOR

CROSS-REFERENCE TO RELATED APPLICATION

This application claims priority to and the benefit of U.S. Provisional Application No. 62/401,070, filed Sep. 28, 2016 and titled "HIGH-PRESSURE, HIGH TEMPERATURE HOLLOW SPHERE ACOUSTIC PRESSURE SENSOR", the entire content of which is incorporated herein by reference.

STATEMENT REGARDING FEDERALLY SPONSORED RESEARCH OR DEVELOPMENT

The United States government has rights in this invention pursuant to Contract No. DE-AC52-06NA25396 between the United States Department of Energy and Los Alamos National Security, LLC for the operation of Los Alamos National Laboratory.

BACKGROUND

One or more aspects of embodiments of the present disclosure are related to pressure sensors (e.g., devices for quantifying and/or detecting changes in pressure). Pressure sensors that are able to work under a range of conditions, including extreme conditions of pressure, temperature, corrosivity, etc., are desired. However, most currently available pressure sensors are limited to operating at temperatures below about 300° C.

SUMMARY

According to embodiments of the present disclosure, a method of configuring a pressure sensor includes transmitting a vibrational signal to a spherical core, the vibrational signal including a range of frequencies, thereby causing the spherical core to exhibit a resonance response at one or more frequencies within the range of frequencies; monitoring the spherical core for the resonance response according to a frequency response technique; applying a series of known pressure loads to the spherical core to generate a series of RUS spectra corresponding to the series of known pressure loads; identifying a peak shift in the series of RUS spectra; and correlating a magnitude of the peak shift with the series of known pressure loads to generate a calibration that can be used to characterize an unknown pressure load.

According to embodiments of the present disclosure, a method of measuring pressure using the configured pressure sensor includes: transmitting a vibrational signal to a spherical core, the vibrational signal including a range of frequencies, thereby causing the spherical core to exhibit a resonance response at one or more frequencies within the range of frequencies; monitoring the spherical core for the resonance response according to a frequency response technique; applying an unknown pressure load to the spherical core; and calculating the unknown pressure load by comparing the peak shift under the unknown pressure load to the calibration.

In some embodiments, the frequency response technique may be resonant ultrasound spectroscopy (RUS).

In some embodiments, the spherical core may be hollow.

In some embodiments, the spherical core may have a wall thickness of about 0.1 mm to about 5 mm.

In some embodiments, the transmitting a vibrational signal to the spherical core may include sweeping a voltage signal from low to high or high to low frequency in a piezoelectric transducer.

In some embodiments, the known pressure loads and unknown pressure load may be uniaxially applied.

In some embodiments, the known pressure loads and unknown pressure load may be hydrostatically applied.

In some embodiments, the calibration may be a standard curve.

In some embodiments, the standard curve may be encoded as an equation generated by fitting the standard curve.

According to embodiments of the present disclosure, a sensor for measuring pressure includes a spherical core; a transmitter configured to transmit vibrational signals to the spherical core; and a receiver on the opposite side of the spherical core from the transmitter and configured to receive the vibrational signals from the spherical core, wherein the vibrational signals cause the spherical core to resonate at a frequency that shifts under pressure, and the frequency shift is correlated to the pressure by comparison to a calibration.

In some embodiments, the spherical core may be a hollow sphere.

In some embodiments, the spherical core may have a wall thickness of about 0.1 mm to about 5 mm.

In some embodiments, the spherical core may be a solid sphere.

In some embodiments, the spherical core may be made of a metal selected from aluminum, steel, titanium, and tungsten.

In some embodiments, the transmitter and the receiver may be piezoelectric transducers.

In some embodiments, the piezoelectric transducers may each be made of lithium niobate.

According to embodiments of the present disclosure, a device for measuring pressure includes the sensor; a voltage signal generator coupled to the transmitter in the sensor by a first coaxial cable, the voltage signal generator being configured to drive the transmitter to transmit the vibrational signals to the spherical core; a frequency response spectrometer coupled to the receiver by a second coaxial cable, the frequency response spectrometer configured to detect the frequency shift of the vibrational signals from the spherical core; and a processor coupled to the frequency response spectrometer, the processor being configured to identify the frequency shift and compare the frequency shift to the calibration. In some embodiments, the frequency response spectrometer may be a resonant ultrasound spectrometer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and advantages of the present invention will be better understood by reference to the following detailed description when considered in conjunction with the accompanying drawings, in which.

Figure 4:
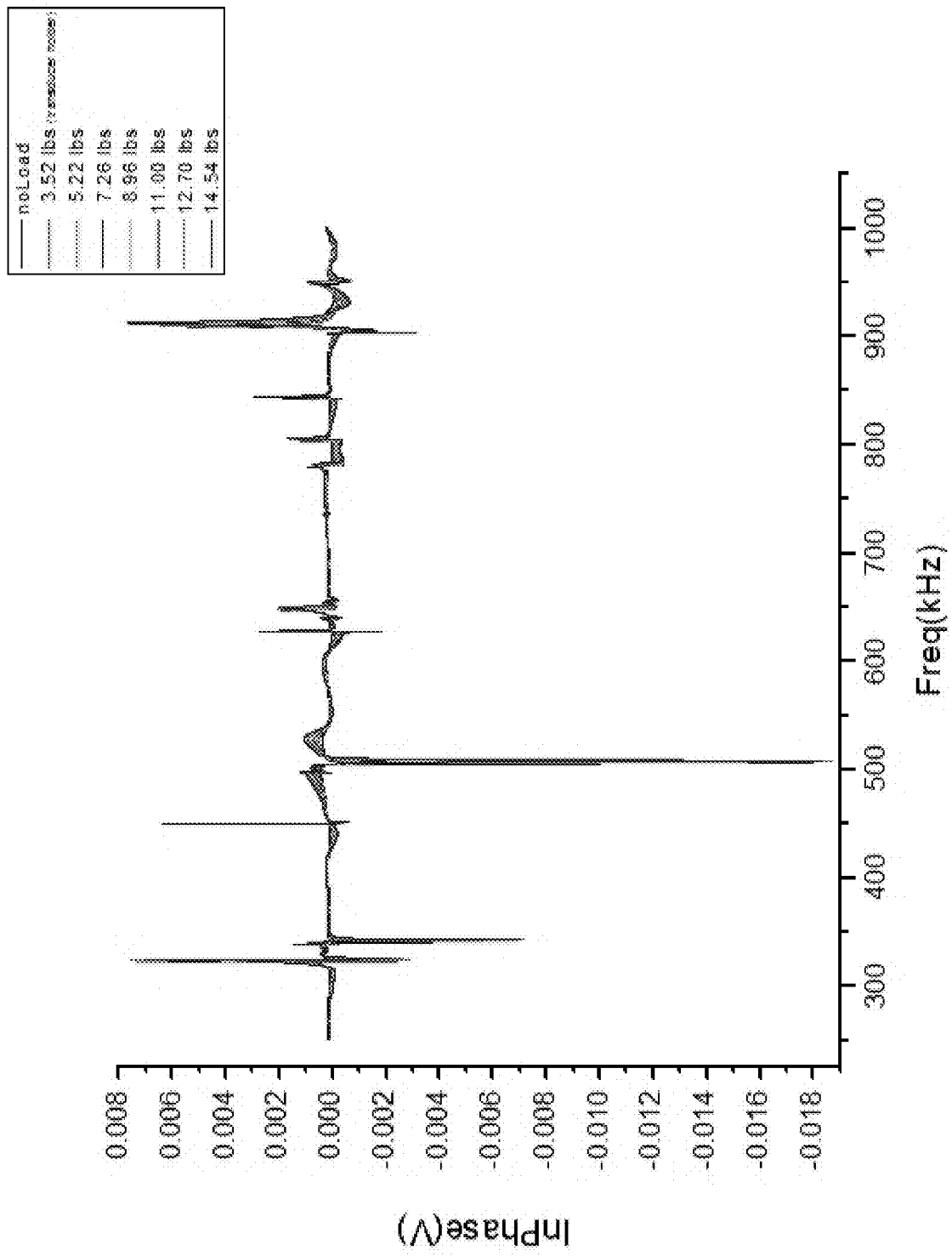
Figure 5:
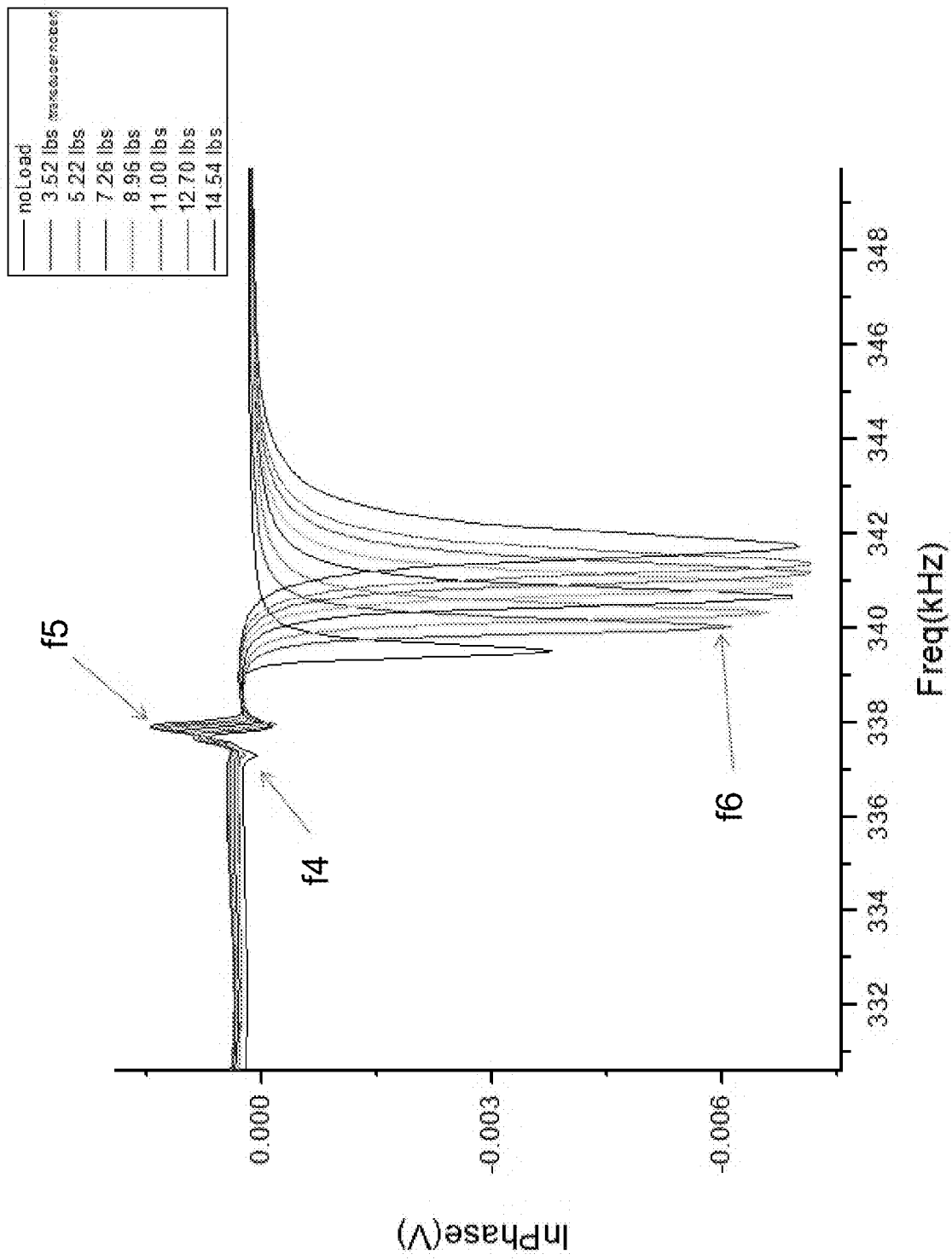
Figure 6:
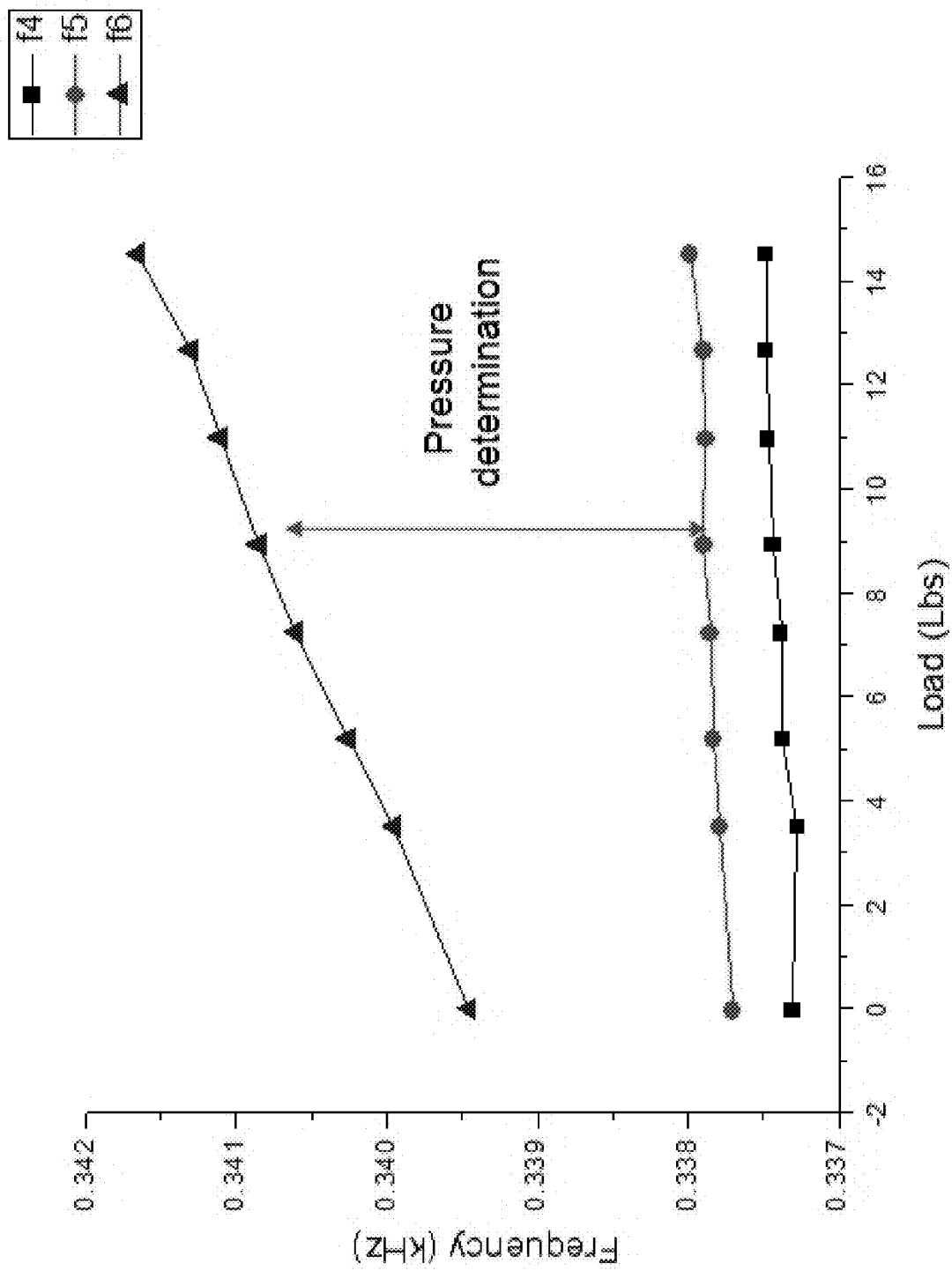
Figure 8:
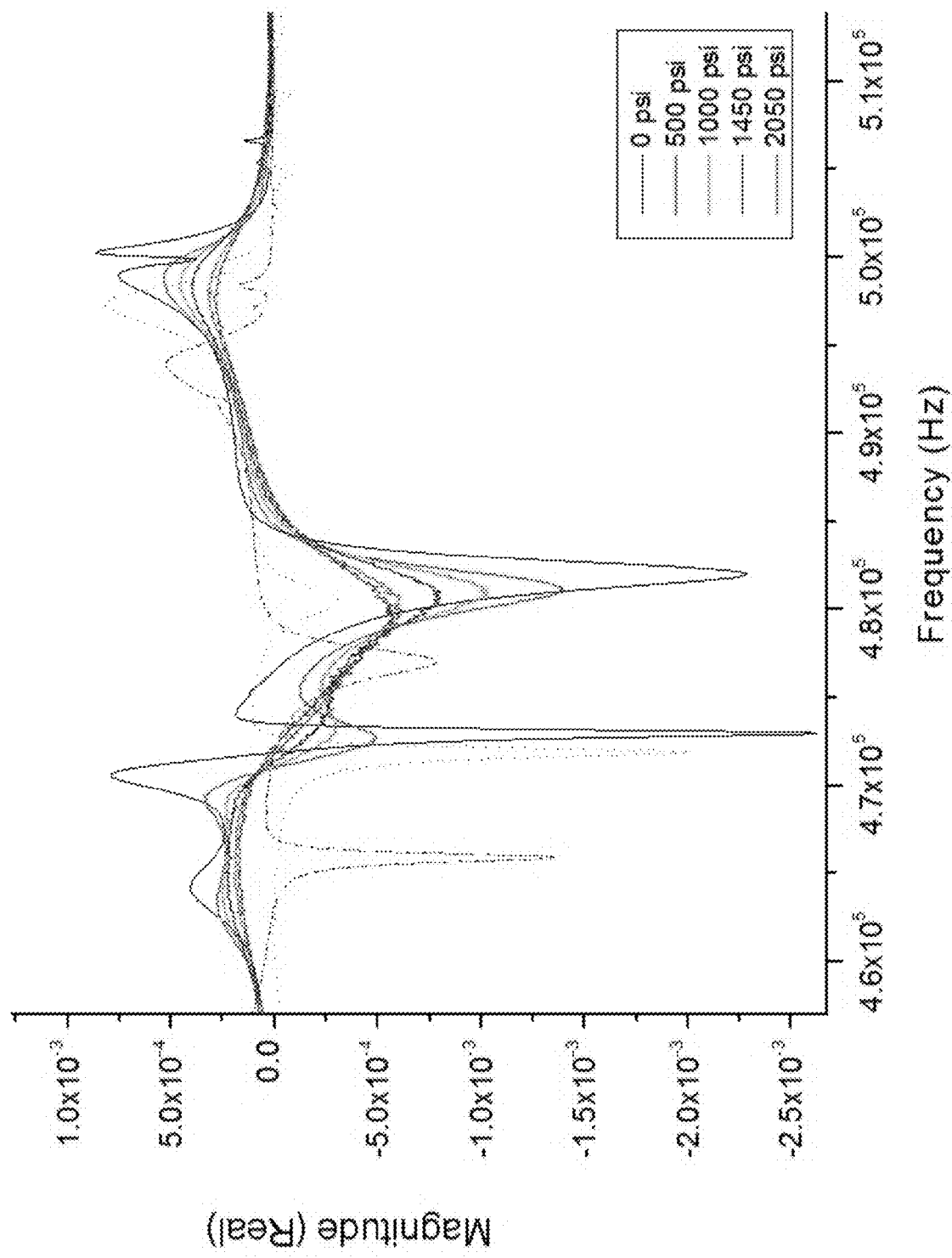
Figure 9:
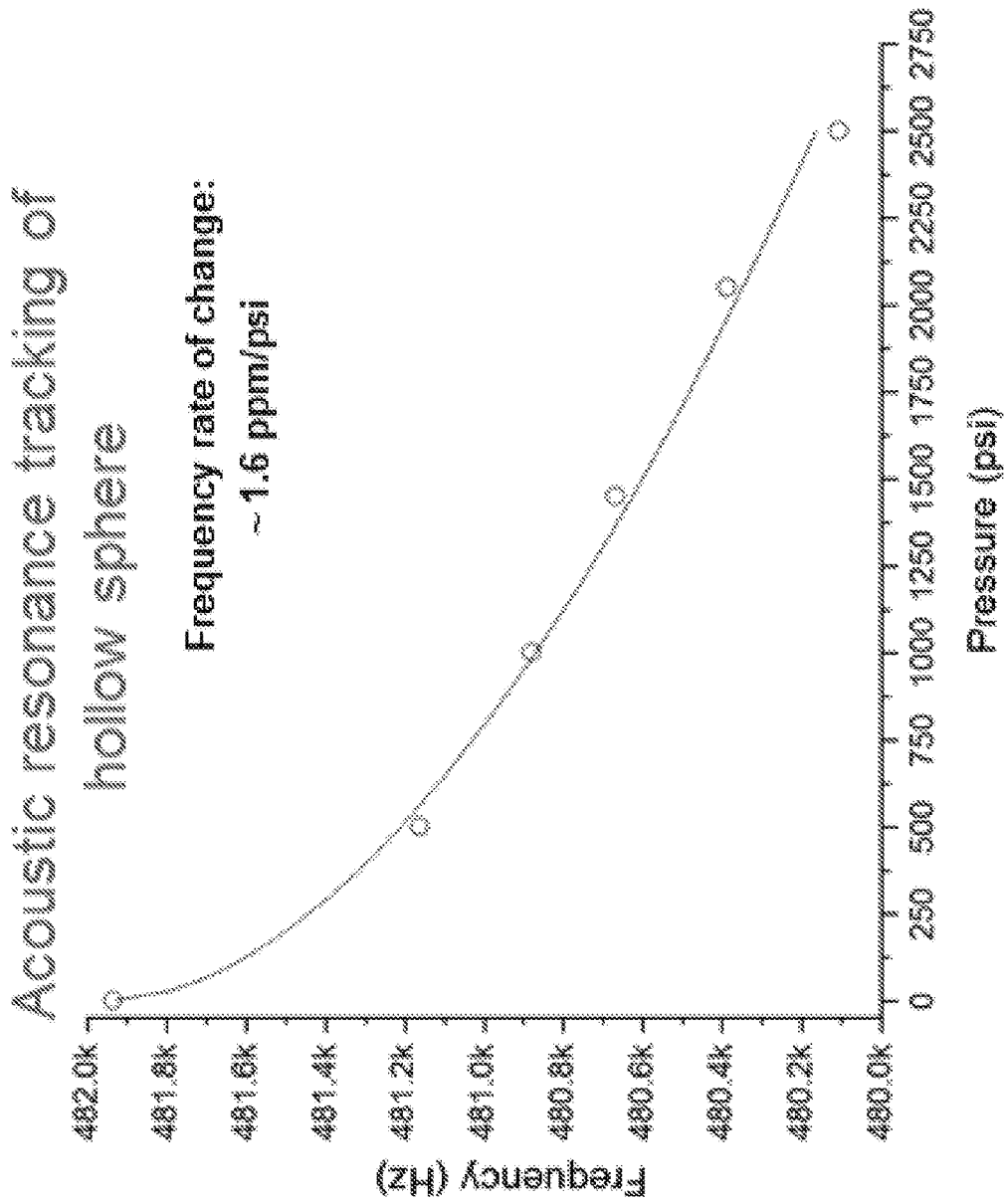

MPa uniaxial pressure. The color gradient scale ranges through the visible spectrum from blue to red to denote increasing displacement or vibrational amplitudes above 0;

FIG. 4 is a plot of the RUS spectrum of a hollow 5/16 inch steel sphere under uniaxial pressure loads ranging from 0 lbs. (noLoad, black trace) to 14.54 lbs. (brown trace), according to embodiments of the present disclosure;

FIG. 5 is a plot of the portion of the RUS spectrum of FIG. 4 between about 331 kHz to about 350 kHz, focusing on the variation of the second split peak frequency under pressure loads ranging from 0 lbs. (noLoad, black trace) to 14.54 lbs. (brown trace), according to embodiments of the present disclosure;

FIG. 6 is a plot of frequency vs. pressure load for three peaks in the RUS spectra of the pressure sensor of FIG. 5, according to an embodiment of the present disclosure, showing a pressure-dependent splitting (e.g., differentiation in frequency) of three degenerate frequency modes;

FIGS. 7A-7D are a series of plots of the RUS spectra at 0 psi of hollow Al spheres with diameters of 0.25 inch, 0.375 inch, 0.5 inch, and 1 inch, according to embodiments of the present disclosure;

FIG. 8 is a plot of the RUS spectrum of a hollow Al sphere under hydrostatic pressure loads ranging from 0 psi (black trace) to 2050 psi (magenta trace), according to an embodiment of the present disclosure; and FIG. 9 is a graph showing the change in resonance frequency according to applied hydrostatic pressure load in FIG. 8, according to an embodiment of the present disclosure.

DETAILED DESCRIPTION

One or more aspects of embodiments of the present disclosure are directed toward a method of measuring an unknown pressure load, and a sensor for measuring pressure (e.g., a pressure sensor). The method and sensor are capable of operation at high pressures (>2000 Pa) and/or high temperatures (>300° C.). However, the method and pressure sensor are not limited to operating at high temperatures, and are also suitable for operation at temperatures between about 25° C. to about 300° C., or lower temperatures. In some embodiments, for example, the method and sensor may be utilized at temperatures down to about −73° C. (e.g., in arctic conditions or other planetary conditions), and in some embodiments, down to about 150 mK (e.g., for applications in low-temperature solid state physics).

One or more aspects of embodiments of the present disclosure provide a method of measuring pressure and a pressure sensor whose operation is based on measuring the effect of pressure loads on the acoustic resonance mode frequencies of a core. In some embodiments, the core may be a spherical core (e.g., a core having the shape of a sphere). The term "core", as used herein, refers to an object having a property that is known to vary in a reproducible, predictable, and measurable manner in response to a particular stimulus or condition of interest (here, a pressure load). In some embodiments, the stimulus may have at least two states (e.g., off/on or no/yes), and in some embodiments, may vary in intensity over a range of possible values. The relationship between the property of the core and the stimulus is injective (one-to-one), such that the measured property of the core can be used to infer the intensity or value of the stimulus.

According to embodiments of the present disclosure, the pressure sensor relies on a resonance-based frequency response technique as the physical basis for its sensing mechanism. Resonance-based frequency response techniques take advantage of resonance phenomena, which can occur when a wave being transmitted through a solid material meets certain conditions that lead to formation of a standing wave. The terms "resonance" and "resonant" are interchangeably used herein in their art-recognized senses to refer to the tendency of the core to vibrate with greater amplitudes at frequencies that meet those standing wave conditions. The term "frequency response" is used herein in its art-recognized sense to refer to techniques or methods that operate by exposing an object (e.g., a core) to a range of frequencies, and monitoring or analyzing the response as a function of frequency. In particular, the core may be analyzed for a resonance response, and a frequency domain spectrum of the core's response may be referred to as a "resonance spectrum", an "acoustic resonance mode frequency spectrum", or by other like terms. In a resonance spectrum, the x-axis domain spans the range of acoustic frequencies applied to the core, while the y-axis shows the response amplitude (in volts) of the core to those waves. When resonance causes the core to vibrate at a relatively high amplitude, a peak is generated in the resonance spectrum at each resonant frequency.

Resonance-based frequency response methods have been used in the related art to yield data on the mechanical properties of solid materials with relatively high absolute accuracies and signal-to-noise (S/N) ratios, variants of which include resonance ultrasound spectroscopy (RUS), Resonant Acoustic Spectroscopy (RAS), Swept-Frequency Acoustic Interferometry (SFAI), and many others. For example, RUS has been used to determine the elastic moduli of alloy, ceramic, and mineral specimens provided in the shape of a parallelepiped, a cylinder, a sphere, or other well-defined geometries, as discussed in, e.g., Migliori A, Sarrao J., *Resonant Ultrasound Spectroscopy*, 1997, Wiley-Interscience, New York, the entire content of which is incorporated herein by reference. The term "well-defined geometry" is used herein to refer to a three-dimensional shape possessing a high degree of radial and/or mirror symmetry, and that can be simply defined as a polyhedron (e.g., a regular convex polyhedron), a sphere, or an ellipsoid.

According to embodiments of the present disclosure, a metal or ceramic core having a well-defined geometry is exposed to a series of known pressure loads, and a frequency response technique (such as RUS) is used to measure the effects of the pressure loads on the acoustic resonance frequencies of the core. Resonance frequencies are determined, in part, by strain associated with deforming the material during vibration. Accordingly, when a pressure load is applied to the core, the additional strain may change the observed resonance frequencies, which may be reflected as a shift (e.g., value change) in one or more peaks of the resonance spectrum. As used in this context, the term "shift" refers to a change in frequency, e.g., $\Delta v$, while the term "value" refers to the absolute frequency, e.g., v. Furthermore, when the change in frequency is proportional to the change in pressure, the magnitude of the peak shift can be correlated with the magnitude of the pressure load. A calibration can thereby be generated for the core by exposing the core to various known pressure loads and correlating these pressures to one or more frequency shifts (e.g., as observed in two or more resonance spectra). The core can then be exposed to unknown (test) pressure loads, and the effects of the test pressure loads on the resonance frequencies of the core can be compared to the calibration to calculate the pressure, thereby enabling accurate pressure determination without a computationally intensive inverse calculation, as is required in other applications of frequency response techniques such as RUS.

In some embodiments, when the pressure load is non-uniform (e.g., anisotropic), a change in the acoustic resonance mode frequency spectrum may arise from the phenomenon of degenerate mode splitting under uniaxial stress. That is, because the core is a three-dimensional object, vibrational waves may exhibit resonance in the core in more than one dimension. When the core is physically symmetric (e.g., includes two or more axes having the same length), two or more resonances corresponding to those axes may be degenerate (e.g., may occur at the same or substantially similar frequencies, thereby presenting as a single peak). For example, a cubic core may have three degenerate resonances corresponding to standing waves generated along the x, y, and z axes of the cube, and a prismatic core with x=y z may have two degenerate resonances corresponding to standing waves generated along the x and y axes of the prism.

When the core is subsequently placed under stress (e.g., a uniaxial pressure load) so that the core is deformed, the resonance frequencies of the vibrational waves in the direction(s) of the deformation are correspondingly changed. If the deformation is larger along one axis, the resonance frequencies along that axis will change more than those along the other axes. In other words, when the physical symmetry of the core is reduced, the formerly degenerate frequencies of the resonance modes are "split" so that they occur at different frequencies (e.g., appear at a value shifted from the original degenerate frequency). The degree and distance of this splitting may also be monitored using frequency response techniques and used to generate a calibration from a series of known pressure loads, or to determine the amount of an unknown pressure load on the core.

As used herein, the term "calibration" may refer to any suitable method or tool for fully characterizing and describing the response of the core to a stimulus (in this case, a change in the resonance frequency of the core in response to pressure). The calibration may be generated by exposing the core to a range of various pressures, recording the response of the core to these pressures, and generalizing the response of the core to pressures within that range, for example, by interpolation. In some embodiments, the response of the core may be further generalized to pressures outside of that range, for example, by extrapolation. In either case, is assumed that the relationship between the applied pressure and the response can be suitably described in terms of a smooth, continuous function. The range of various pressures may include at least two (pressure, response) data points; however, a larger number of data points may provide greater accuracy, particularly when the relationship between pressure and response is not substantially linear.

In some embodiments, the calibration may include a collection of (pressure, response) data points, and the calibration is used by identifying the two data points that bracket the response produced by the unknown pressure load, and mathematically interpolating (e.g., taking the pressure average of) those two data points to calculate or predict the unknown pressure. In some embodiments, the calibration may include a collection of (pressure, response) data points that are used to generate a plot or graph that graphically interpolates and/or extrapolates additional points in the pressure-response relationship of the core. The resulting calibration plot (e.g., standard curve or calibration curve) describes the pressure-response relationship over a continuous range, and can be used to graphically calculate or predict the unknown pressure by comparison. In some embodiments, the calibration may be an equation or model that expresses the resonance frequency as a function of applied pressure, as generated by fitting the data points or curve fitting the graph. Any suitable method of curve or data fitting may be used, for example, linear regression, any iterative algorithm using least squares fitting, etc.

In some embodiments, when the response of the core to pressure is observed as a resonance frequency peak, the data points used in the calibration may specifically be (pressure, peak value) data points.

In some embodiments, when the response of the core to pressure is encoded as a resonance frequency peak and an applied pressure causes one or more peaks to shift, the data points used in the calibration may specifically be (pressure, peak shift) data points. In some embodiments, the peak shift may be expressed in relation to an initial peak value (e.g., value under standard conditions of no applied pressure). In some embodiments, the peak shift may be expressed in relation to a peak that remains static regardless of pressure conditions.

According to embodiments of the present disclosure, a method of measuring an unknown pressure load includes: configuring a pressure sensor by transmitting a vibrational signal including a range of frequencies to a core, thereby causing the core to exhibit a resonance response at one or more frequencies within the range of frequencies; monitoring the core for the resonance response according to a frequency response technique; applying a series of known pressure loads to the core to generate a series of resonance spectra corresponding to the series of known pressure loads; identifying a peak shift in the series of resonance spectra; and correlating a magnitude of the peak shift with the series of known pressure loads to generate a calibration. According to embodiments of the present disclosure, a method of measuring an unknown pressure load using the configured pressure sensor includes: transmitting a vibrational signal including a range of frequencies to a core, thereby causing the core to exhibit a resonance response at one or more frequencies within the range of frequencies; monitoring the core for the resonance response according to a frequency response technique; and calculating the unknown pressure load by comparing the peak shift under the unknown pressure load to the calibration.

The frequency response technique may be any suitable frequency response technique, such as resonance ultrasound spectroscopy (RUS), Resonant Acoustic Spectroscopy (RAS), Swept-Frequency Acoustic Interferometry (SFAI). In some embodiments, the frequency response technique may be resonance ultrasound spectroscopy (RUS).

The core may have any three-dimensional shape having a well-defined geometry, as defined herein. For example, the core may be a regular polyhedron, a platonic solid, a prism, a parallelepiped, a sphere, an ellipsoid, a cylinder, or a torus, but embodiments of the present disclosure are not limited thereto. In principle, almost any shape may be used, but the data analysis may be more complicated and/or may require additional calibration. Accordingly, in some embodiments, the core may be a highly symmetric and well-studied shape such as a sphere, an ellipsoid, or a cylinder. In some embodiments, the core is a sphere (e.g., a spherical core).

In some embodiments, the core may be a solid mass (e.g., a solid core). For example, the internal volume of the core may consist of substantially the same material, and the core may not have any internal voids or cavities. When the core is a solid mass, the pressure sensor may have increased pressure resistance and may therefore be more suitable for use in higher pressure applications. In some embodiments, the core may be a solid sphere (e.g., a solid spherical core).

In some embodiments, the core may be hollow (e.g., may be a shell surrounding a cavity). When the core is hollow, the core may have decreased pressure resistance, but may be more sensitive to changes in pressure, compared to a pressure sensor including a solid core of corresponding size. In some embodiments, the core may be a hollow sphere (e.g., a hollow spherical core).

When the core is hollow, for example, when the core is a hollow sphere, the wall may have the same or substantially the same thickness at every point on the core. In some embodiments, the wall thickness may be about 0.1 mm to about 5 mm, for example, about 0.25 mm to about 4 mm, about 0.5 mm to about 3 mm, or about 0.75 mm to about 2 mm. Thinner shells may be correlated with lower resonance frequencies.

In some embodiments, when the core is hollow and includes a cavity, the cavity may be filled with a gas or a vacuum. Non-limiting examples of such gases may include air, nitrogen, argon, helium, etc.

The size or outer dimensions of the core are not particularly limited. For example, smaller core dimensions are associated with higher frequencies in response to a given pressure. In some embodiments, the core may have a length (longest dimension) of about 0.1 mm to about 5 cm, for example, about 0.5 mm to about 5 cm, about 1 mm to about 5 cm, about 5 mm to about 2.5 cm, or about 10 mm to about 1 cm. In some embodiments, when the core is a sphere, the sphere may have an external diameter of about 0.1 mm to about 5 cm, for example, about 0.5 mm to about 5 cm, about 1 mm to about 5 cm, about 5 mm to about 2.5 cm, or about 10 mm to about 1 cm.

As described herein, the size and thickness parameters of the core or hollow sphere may be suitably selected according to the pressure ranges to be measured, the experimental environment, and the desired sensitivity of the data. However, these sizes are only examples, and embodiments of the present disclosure are not limited thereto.

The material used to form the core is not particularly limited as long as it has an elastic modulus that is compatible with the range and resolution of pressures to be monitored. As used herein, the term "resolution" refers to the minimum interval or pressure difference that can be accurately measured, and higher resolution data is associated with higher sensor sensitivity. For example, the core and its material should be subject to detectable levels of deformation over the range and resolution of pressures to be monitored, and should not collapse, shatter, permanently deform, or otherwise fail as the pressure is increased over the range of interest.

In some embodiments, the material may also be selected to be suitable for the range of ambient temperatures in the sensor application. For example, the core and its material may be selected so that it does not melt or permanently deform at elevated temperatures (e.g., temperatures above about 50° C., for example, above about 100° C., 200° C., 300° C., 400° C., 500° C., etc.), and/or does not become brittle and stiff at lower temperatures (e.g., temperatures below about 50° C., for example, below about 0° C., −100° C., −200° C., −300° C., −400° C., etc.). Those having ordinary skill in the art are capable of selecting a suitable material for a particular pressure range, temperature range, or application according to the principles described herein.

In some embodiments, the core may be formed of a metal, a metal alloy, a ceramic, a glass, a crystalline material, or any other hard solid material or mixture thereof. As used herein, the term "glass" may refer to a non-crystalline amorphous solid that exhibits a glass transition when heated; for example, silica glasses such as fused quartz, sodium borosilicate, aluminosilicate, and/or the like. As used herein, the term "ceramic" may refer to an inorganic and non-metallic solid comprising atoms held together in networks of ionic and covalent bonds; for example, silicon carbide, silicon nitride, zirconium oxide, and the like. As used herein, the term "crystalline material" may refer to an inorganic and non-metallic solid (such as a ceramic, metalloid, or the like) in which the comprising atoms are held together via ionic bonds and arranged with long-range periodicity; for example, quartz, silicon, anatase, rutile, etc.

In some embodiments, when the core is formed of a metal, the core may include aluminum, titanium, tungsten, stainless steel, or a mixture thereof. In some embodiments, when the core is formed of a ceramic, the core may include alumina, silicon nitride, silicon carbide, or a mixture thereof.

The vibrational signal to be transmitted to the core may include any suitable range of frequencies. In some embodiments, for example, the vibrational signal may include frequencies ranging from about 25 kHz to about 1000 kHz, or any sub-range thereof. The vibrational signal may be continuously varied over the range, and may be applied using any suitable method or waveform. In some embodiments, the vibrational signal may be swept from low to high frequency. In some embodiments, the vibrational signal may be swept from high to low frequency. In some embodiments, the vibrational signal may be applied as a short chirp (about 1 microsecond to about 1 millisecond in duration). In some embodiments, the vibrational signal may be applied as a special waveform including all frequency contents of interest at any point in time.

In some embodiments, a transmitter and a receiver may be utilized to transmit the vibrational signal to the spherical core and to monitor the spherical core for the resonance response. The resonance response of the spherical core may be the same as described herein in connection with resonance phenomena and frequency response techniques, such as RUS.

In some embodiments, the transmitter and receiver may be capable of converting voltage signals to vibrational signals and vice versa. As such, the vibrational signals may be provided to the transmitter and retrieved from the receiver in the form of a voltage signal. The transmitter and receiver may each be a piezoelectric transducer; however, embodiments of the present disclosure are not limited thereto. Any device capable of transmitting and receiving (e.g., monitoring) vibrations may be used, for example, a laser, an electromagnetic acoustic transducer (EMAT), an optical device, a projecting device, etc. The transmitter and receiver may each be the same type or kind of device, or they may be different from each other.

When the transmitter and/or receiver is a piezoelectric transducer, the piezoelectric material used to form the transducer is not particularly limited. In some embodiments, for example, the transducer may be made of lead zirconate titanate (PZT), quartz, tourmaline, bismuth titanate ($Bi_4Ti_3O_{12}$), gallium orthophosphate ($GaPO_4$), aluminum nitride (AlN), lithium gallium tantalate (langatate), lithium gallium silicate (langasite), or lithium niobate ($LiNbO_3$). In some embodiments, the transducer may be made of lithium niobate ($LiNbO_3$).

In general, materials having a higher Curie Temperature ($T_C$) are compatible with a wider range of temperatures (e.g., have higher temperature use limits) because piezoelectric material properties are known to decrease as the temperature approaches $T_C$. PZT ($Pb[Zr_xTi_{1-x}]O_3$, $0<x<1$) is one of the most widely used transducer materials. The $T_C$ of PZT is about 195° C. to about 300° C., depending on the specific composition (e.g., the value of x). Quartz ($SiO_2$) has a higher $T_C$ of about 573° C., but cannot be used for long durations in high temperature applications. $LiNbO_3$ has a $T_C$ of about 1145° C. The $T_C$ of each piezoelectric material used in the transducer may accordingly determine the upper temperature limit of the pressure sensor.

The shapes of the transmitter and receiver are not particularly limited. In some embodiments, they may be disk-like (cylindrical), rectangular, etc., and may be flat or curved.

In some embodiments, the transmitter and receiver are in direct contact with the core. For example, the transmitter and receiver may each physically touch or share an interface with the surface of the core, and may directly transmit the vibrational signals or monitor the resonance response through those interfaces.

In some embodiments, the transmitter and/or receiver may be placed at a distance from the core, and the vibrational signals/resonance response can be excited and measured remotely. Accordingly, the sensor may have improved temperature and pressure capabilities because the transmitter, receiver, and any associated wiring are not exposed to the extreme conditions experienced by the sensor core, and do not limit the range of conditions in which the sensor can be used. In some embodiments, such as when the pressure sensor is to be used in aggressive media, the vibrational signals/resonance response may be transmitted and monitored through a window. As used herein, the term "aggressive" as used to describe media may refer to dangerous conditions involving explosives, radioactivity, high or low temperature, etc.

The series of known pressure loads that may be applied to the spherical core to generate a peak shift and a calibration are not particularly limited, as long as they are applied using a consistent geometry (e.g., along a consistent set of axes) and are able to produce a suitably accurate calibration, as would be judged by those having ordinary skill in the art and determined by the desired pressure resolution. In some embodiments, for example, the known pressure loads may span a range that extends past the unknown pressure load in both directions, so that the unknown pressure load is bracketed by data points from known pressure loads. The known pressure loads may be spaced at regular or irregular intervals to generate data points across the calibration range, and the number of data points may be 3 or more to avoid the possibility of assuming a linear calibration for a non-linear relationship. In some embodiments, for example, the number of data points may be spaced at intervals of every one-fifth of the total range, or intervals of every one-tenth of the total range, etc. The accuracy of the calibration may be determined using any suitable method available in the art. In some embodiments for example, the calibration may be judged by regression analysis of the data.

In some embodiments, the known pressure loads and unknown pressure load may be uniaxially applied to the core. For example, the pressure loads may be applied in the form of added weights that are vertically stacked on and above the core, and thereby apply pressure along a single axis of the core via the force of gravity.

In some embodiments, the known pressure loads and unknown pressure load may be hydrostatically applied to the core. The term "hydrostatic pressure" and related terms are used herein in their art-recognized sense to refer to pressure exhibited by a fluid at equilibrium on all surfaces of the core (e.g., in every direction) due to the force of gravity on the column of fluid directly above the device or point of interest. Such hydrostatic pressurization may occur in drilling and well applications.

In some embodiments, when the shape of the core is anisotropic and pressure is uniaxially applied to the core, the core may be oriented so that a particular dimension of the core is parallel to the direction of applied pressure. In some embodiments, for example, the orientation of the core may be selected so that the shortest dimension is parallel to the direction of applied pressure. In some embodiments, the orientation of the core may be selected so that the longest dimension is parallel to the direction of applied pressure. The orientation may affect the sensitivity and the measurable pressure range. For example, positioning the shortest dimension parallel to the direction of applied pressure may result in higher peak frequencies and larger peak shifts. It will be understood that those having ordinary skill in the art are capable of selecting a suitable orientation based on the principles described herein.

Any suitable frequency response technique setup available in the art may be used to monitor the core for a resonance response. In some embodiments, the frequency response technique may be RUS. Standard methods of generating resonance spectra and identifying peak shifts in the spectra may be used.

The calibration may be generated using any suitable method, and may be the same as described above. Comparing the peak shift under the unknown pressure load to the calibration may be carried out using the same methods described above. In some embodiments, for example, the calibration may be generated and utilized in the form of a standard curve. In some embodiments, the calibration may be generated and utilized as an equation generated by fitting the standard curve.

According to embodiments of the present disclosure, a sensor for measuring pressure includes a core; a transmitter configured to transmit vibrational signals to the spherical core; and a receiver on the opposite side of the core from the transmitter, configured to receive the vibrational signals from the core. The vibrational signals may cause the spherical core to resonate at a frequency that shifts under pressure, and the frequency shift is correlated to the pressure by comparison to a calibration.

The core may be the same as described herein in connection with the method of measuring pressure. In some embodiments, the core may be a spherical core.

In some embodiments, the core may be a hollow sphere. When the core is a hollow sphere, the core may have the same wall thickness as described above, for example, about 0.1 mm to about 5 mm, for example, about 0.25 mm to about 4 mm, about 0.5 mm to about 3 mm, or about 0.75 mm to about 2 mm.

In some embodiments, the core may be a solid sphere.

The core may be made of the same materials as described herein in connection with the method of measuring pressure. In some embodiments, for example, the core may be formed of a metal including aluminum, steel, titanium, tungsten, or mixtures thereof.

The transmitter and receiver may be the same as described herein in connection with the method of measuring pressure. In some embodiments, for example, the transmitter and receiver may both be piezoelectric transducers. In some embodiments, the piezoelectric transducers may be formed of lithium niobate.

The vibrational signals may be the same as described herein in connection with the method of measuring pressure.

The calibration may be the same as described herein in connection with the method of measuring pressure.

Figure 1:
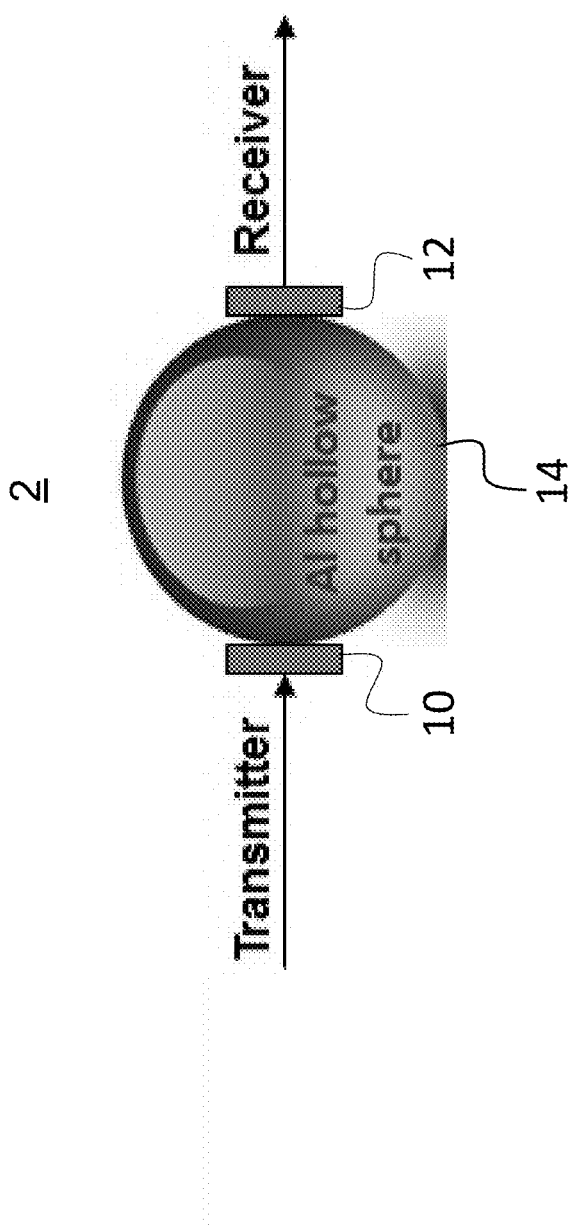
FIG. 1 is a schematic drawing of a pressure according to embodiments of the present disclosure.

FIG. 1 shows a schematic example embodiment of an example pressure sensor. The sensor may be used in a method of measuring an unknown pressure load, according to embodiments of the present disclosure. The sensor 2 includes two piezoelectric transducers 10 and 12 in minimal contact with an Al core 14 having the shape of a hollow sphere. Here, the term "minimal" may refer to, e.g., a point contact, or a contact made with just enough force and area to maintain contact between parts via friction. The left transducer is used as a transmitter, and the right transducer is used as a receiver. An electrical signal including a range of frequencies is applied to the transmitting transducer, and is converted to mechanical (acoustic) vibrations with a corresponding range of frequencies via the piezoelectric effect. The mechanical vibrations are transmitted to the spherical core. The receiving transducer records the resonance response of the core to these frequencies using a narrow bandwidth filter, specifically by monitoring the amplitude (magnitude) of the core's vibrational response vs. the excitation frequency. The resulting frequency spectrum of the core's vibrational response may include multiple resonance peaks, as discussed above.

In FIG. 1, the transmitter 10 and receiver 12 are depicted as being placed at opposite sides of the spherical core, however, embodiments of the present disclosure are not limited thereto. The transmitter and receiver may be placed at any position relative to each other and to the core as long as both are able to send and receive vibrational signals to the core.

According to embodiments of the present disclosure, a device for measuring pressure includes the sensor, a voltage signal generator coupled to the transmitter in the sensor by a first coaxial cable, a frequency response spectrometer coupled to the receiver by a second coaxial cable, and a processor coupled to the frequency response techniques spectrometer.

Figure 2:
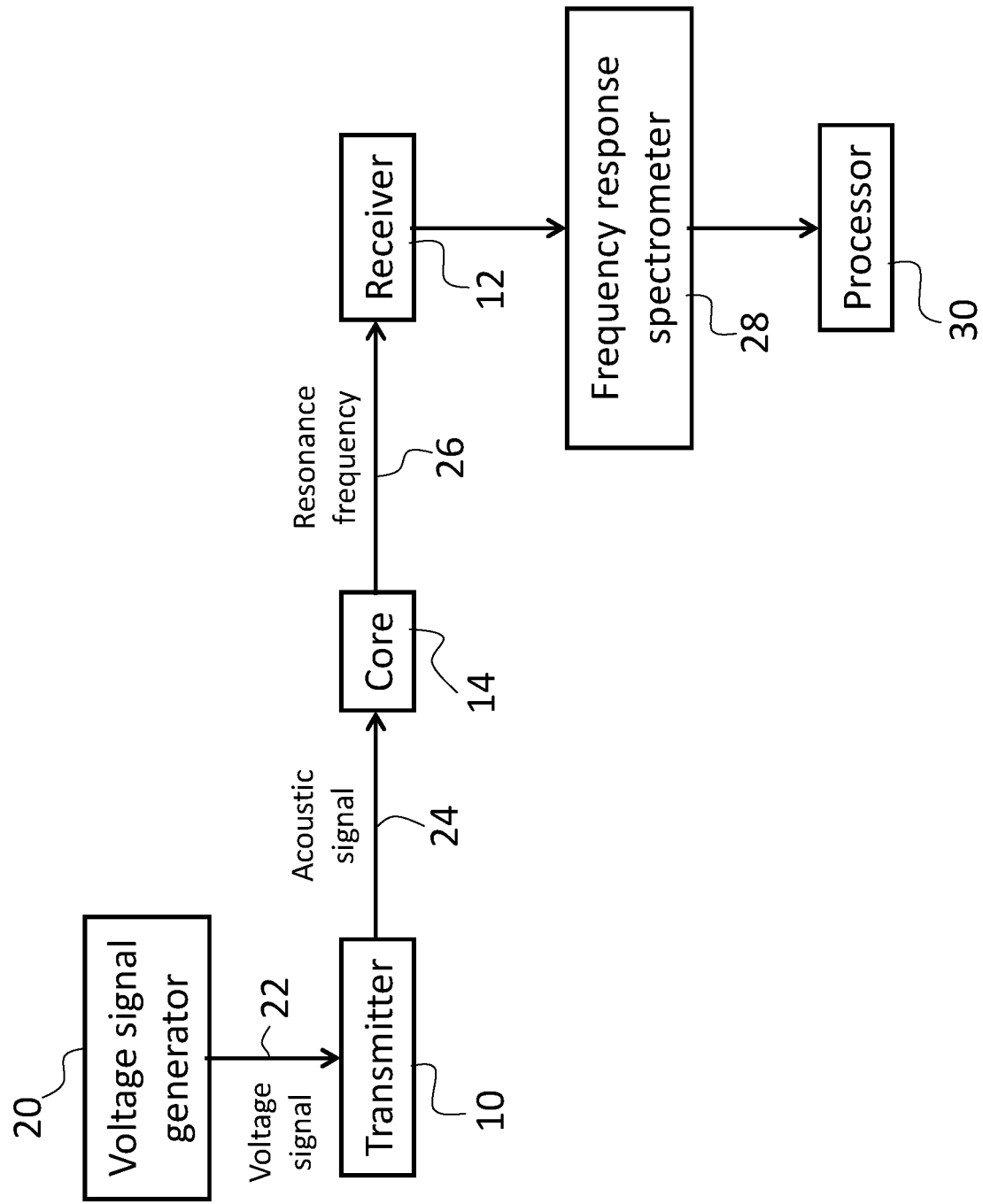
FIG. 2 is a block diagram of a device for measuring pressure, according to embodiments of the present disclosure.

FIG. 2 is a block diagram of an example embodiment of a device for measuring pressure 4, according to embodiments of the present disclosure. In FIG. 2, a voltage signal generator 20 sends a voltage signal 22 to a transmitter 10 via a first coaxial cable. The transmitter sends an acoustic signal 24 to a core 14. The core 14 responds to the acoustic signal 24 by exhibiting a resonance frequency 26, which is observed by the receiver 12. The resonance frequency data collected by the receiver 12 is sent via a second coaxial cable to a frequency response spectrometer 28 coupled with a processor 30.

In some embodiments, additional elements such as amplifiers, filters, etc. may be added to aid in signal transfer and processing, and it will be understood that those of skill in the art are capable of selecting and implementing such additional elements according to the principles described herein.

The voltage signal generator may be any suitable generator available in the art. The voltage signal generator is configured to drive the transmitter to transmit the vibrational signals to the spherical core. For example, the voltage signal generator may be configured to provide a range of voltage frequencies to the transmitter, which then converts the range of voltage frequencies to a corresponding range of acoustic frequencies and transmits those frequencies to the sensor core.

The frequency response spectrometer may be any suitable spectrometer available in the art. In some embodiments, the spectrometer may be a resonant ultrasound spectrometer. The frequency response spectrometer is configured to detect the frequency shift of the vibrational signals from the spherical core.

When the pressure sensor is to be used in industrial applications or in aggressive medial, the first and second coaxial cables should be selected to withstand adverse conditions such as high pressure, high temperature, and corrosion that are present in a typical wellbores. In some embodiments, the first and second coaxial cables may be High Temperature-High Frequency (HTHF) coaxial cables, which can withstand temperatures up to about 600° C. and transmit signals with frequencies up to about 20 GHz. Any HTHF coaxial cable having suitable specifications may be used. For example, a suitable cable may have a signal attenuation of about 0.5 dB/km/MHz, and a characteristic impedance of about 50Ω.

The HTHF coaxial cable may include a conductive core surrounded by an insulator and a sheath. In some embodiments, for example, the HTHF coaxial cable may consist of a copper core, a copper lined stainless steel sheath, and a mineral powder insulator between the core and the sheath. The size of the HTHF coaxial cable is not particularly limited. For example, the outer diameter of the coaxial cable may be about 1 mm to about 5 mm, or about 1 mm to about 2 mm, but embodiments of the present disclosure are not limited thereto.

The processor (processing unit) is configured to identify the frequency shift and compare the frequency shift to the calibration to thereby estimate or calculate the pressure by comparison. Any suitable processor available in the art may be used.

In some embodiments, the processor may be capable of operating in two different modes. The first mode may be a calibration mode used to generate the calibration from the series of known pressure loads. The second mode may be a measurement mode used to measure and calculate the unknown pressure load by comparing the resonance frequency of the core under the unknown pressure load to the calibration.

The following examples and experimental data are provided for illustrative purposes only, and do not limit the scope of the embodiments of the present invention. For example, although the experimental examples include hollow spherical cores, embodiments of the present disclosure are not limited thereto, and it will be understood that those of skill in the art are capable of designing pressure sensors using cores with other geometries according to the principles described herein.

EXPERIMENTAL EXAMPLES

Example 1: Resonant Ultrasound Spectroscopy (RUS) of Hollow Spheres Under Uniaxial Stress A testing setup including a signal (voltage function) generator, a lock-in amplifier, and an RUS spectrometer coupled to a rig including two transducers facing each other (one acting as a transmitter and one as a receiver) was used in each experiment. A hollow spherical core was placed between the transducers to form a vertical stack including, from top to bottom, an upper transducer, the core, and a lower transducer. Uniaxial pressure in the form of varying weights was applied to the core by stacking the weight on the upper transducer. A coaxial cable (from Thermocoax, Suresnes, France) having a signal attenuation of about 0.5 dB/km/MHz and a characteristic impedance of about 50Ω was used to transmit signals to and from the transmitter and receiver, respectively.

Figure 3:
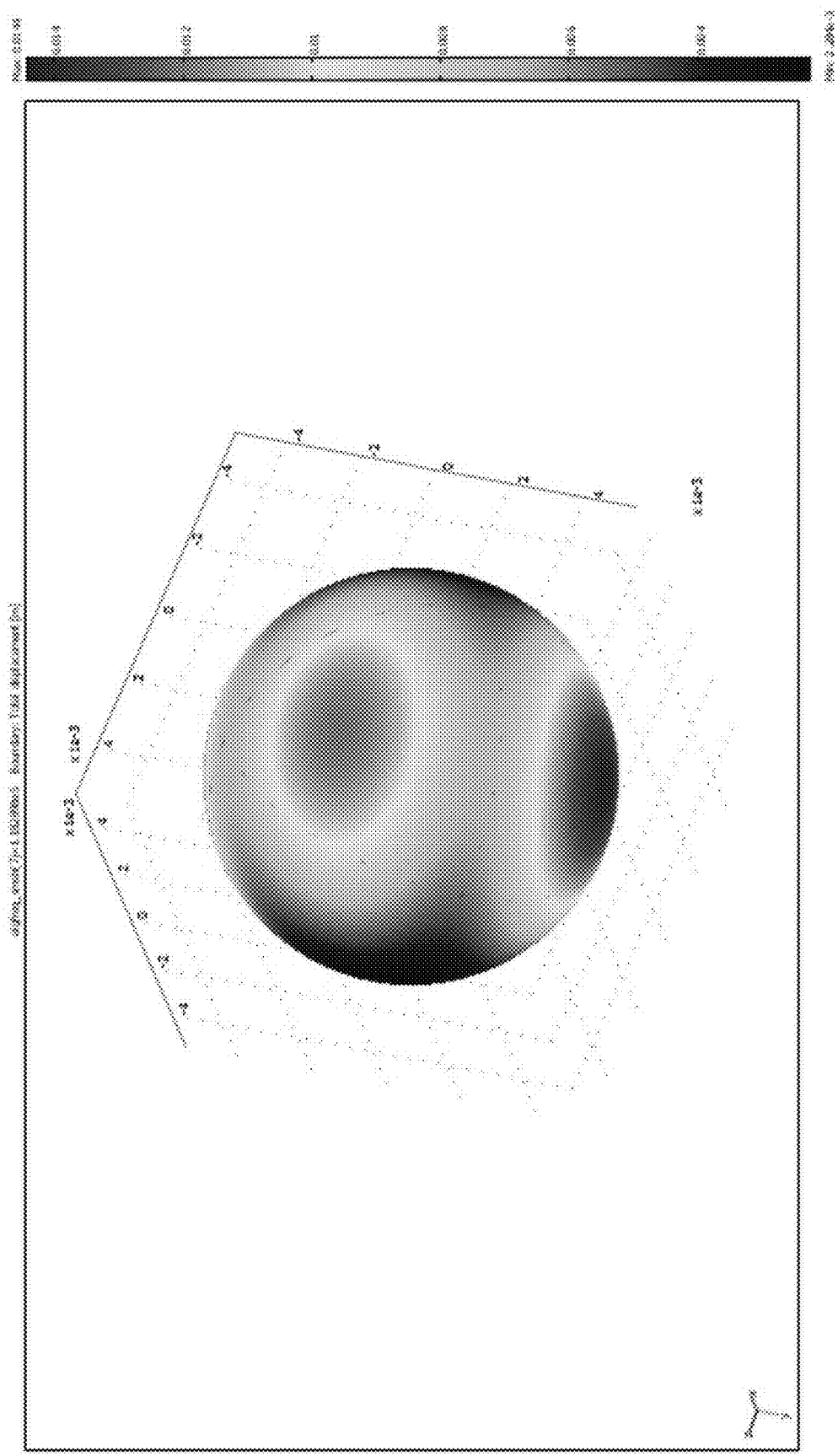
FIG. 3 is a graph of the simulated vibration of one acoustic resonance mode of a hollow Al sphere under 50

Rigorous finite element simulations (theoretical calculations) were performed using COMSOL Multiphysics' acoustic module to visualize and predict the resonance modes of a core (COMSOL, Stockholm, Sweden). FIG. 3 is a graph of one acoustic resonance mode of an Al hollow sphere under 50 MPa pressure, as simulated herein. The color scale indicates total physical displacement on a scale of about 0.014 m to about 0 m, with red corresponding to regions of relatively higher displacement. The displacement is due to the vibration of acoustic waves within the spherical core. The periodic nature of the displacement around the surface of the spherical core is characteristic of the vibration being due to resonant standing waves.

FIG. 4 is a plot of the RUS spectrum between about 250 kHz to about 1000 kHz of a 5/16 (0.3125) inch diameter hollow steel spherical core under eight uniaxial known pressure loads ranging from about 0 lbs. (noLoad, black trace) to about 14.54 lbs. (brown trace). FIG. 5 is a zoomed-in plot of the portion of the RUS spectrum of FIG. 4 between about 331 kHz to about 350 kHz, focusing on the variation of the second split peak frequency (labeled as f6). It is observed that the frequencies of the f4 and f5 peaks remain relatively stable throughout the series, while the frequency of the f6 peak increases (shifts to higher values) with increasing pressure load.

The (pressure, response) data observed in the f4, f5, and f6 peak shifts over the series of known pressure loads in FIGS. 4 and 5 constitute a calibration that can be used to determine subsequent unknown pressure loads. FIG. 6 is a standard curve plot of frequency vs. pressure load for the three peaks in the RUS spectra of the pressure sensor of FIG. 5 (as indicated by arrows), showing a pressure-dependent splitting (e.g., differentiation in frequency) of three degenerate frequency modes. Here, two of the three resonance frequencies (f4 and f5) do not appear to change, while the third resonance frequency (f6) shifts upward by about 2 Hz as the pressure load is increased from about 0 lbs. (0 kg) to about 15 lbs. (6.8 kg). The change in f6 peak value and/or the degree of peak splitting can be compared to that observed under unknown pressure loads to thereby calculate the amount of pressure.

Example 2: Resonant Ultrasound Spectroscopy (RUS) of Hollow Spheres Under Uniform Stress (Hydrostatic Pressure)

Hollow aluminum spherical cores with diameters of about 0.25, 0.375, 0.5 and 1 inch were investigated for use under hydrostatic pressure conditions. The RUS spectra of the cores under no load (ambient pressure) conditions are shown in FIG. 7A-7D. The resonance spectra of the various cores vary in both amplitude and peak value/multiplicity.

Figure 7A:
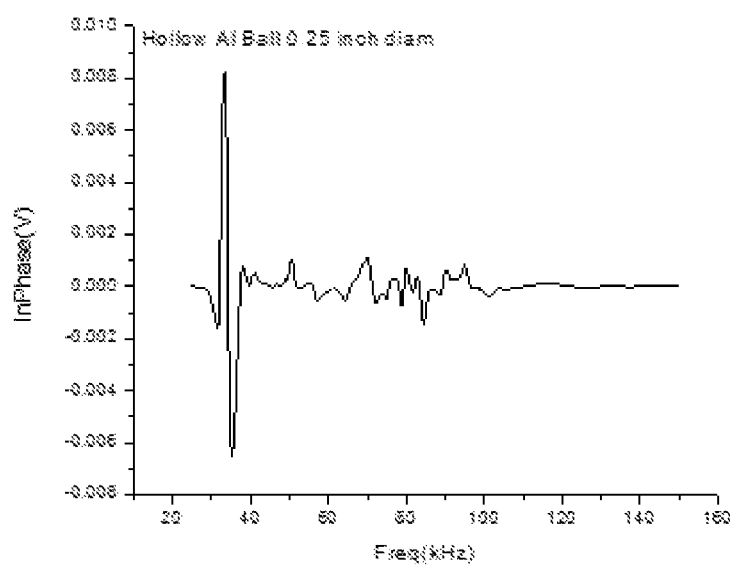
Figure 7B:
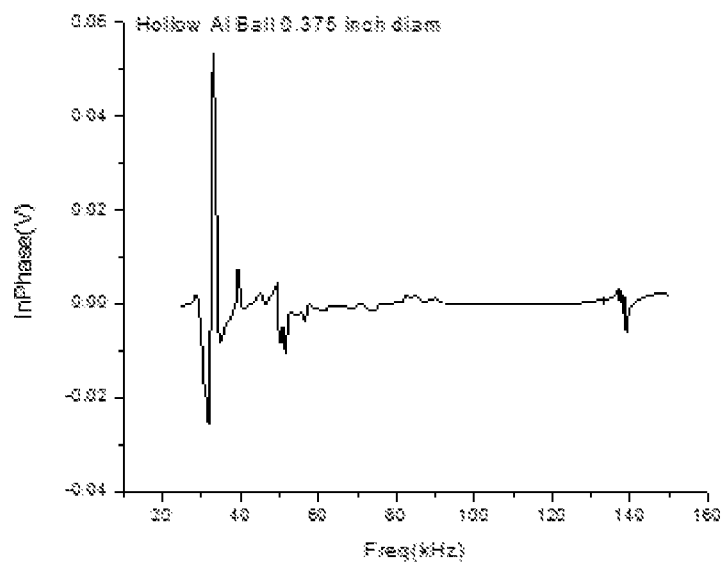
Figure 7C:
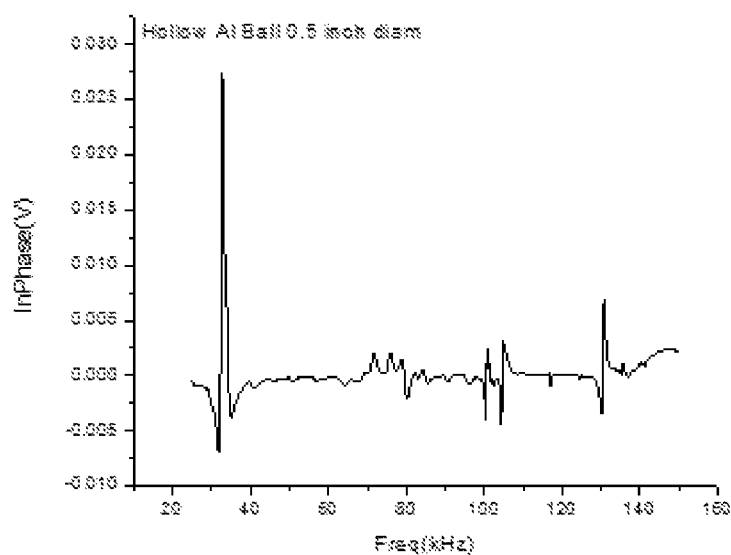
Figure 7D:
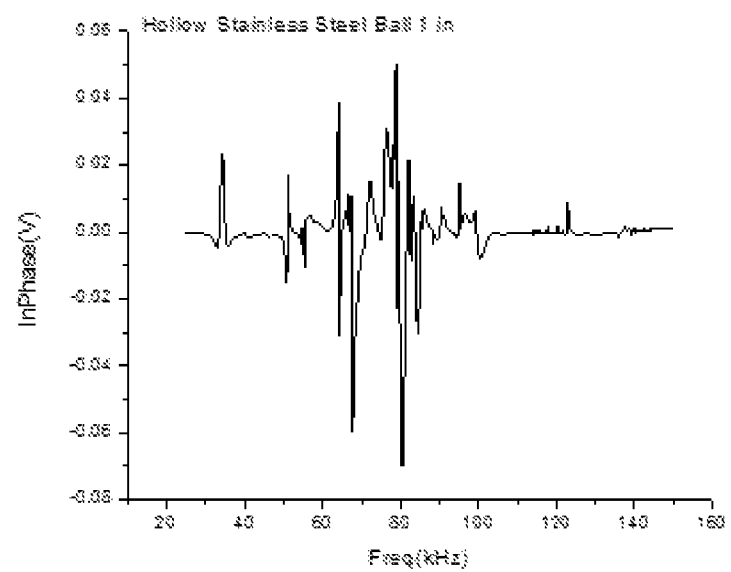

The 0.25 inch diameter aluminum sphere FIG. 7A was selected for further testing under various pressure loads. FIG. 8 is a plot of the RUS spectrum between about 460 kHz to about 510 kHz of the core under five hydrostatic pressure loads ranging from 0 psi (0 Pa, black trace) to 2050 psi (14.13 MPa, magenta trace).

FIG. 9 is a graph showing the change in resonance frequency according to applied hydrostatic pressure load for the peak near 480 kHz in FIG. 7. A sensitivity (e.g., resolution) of 1.6 ppm/psi was calculated by taking the derivative of the curve in FIG. 9 over the linear portion, thereby yielding the rate of change in frequency over pressure.

The pressure sensor according to embodiments of the present disclosure may be used in borehole applications and placed downhole as-is, without any additional mechanical modifications. By measuring borehole pressure at various depths to determine the pressure gradient along the borehole, the locations of borehole fracture intersections and recovery rates of circulating systems can be determined. Similar applications may be found in the oil and gas industry, chemical industry, and pharmaceutical industry. For example, the sensor may be used as a downhole tool (such as for Measurement While Drilling (MWD), Logging While Drilling (LWD), wireline, etc., in wellhead and pump station monitoring), or during geothermal and power generation, etc.

The pressure sensor according to embodiments of the present disclosure can monitor pressure in real-time (e.g., substantially continuously and with little or substantially no delay). The unique, all solid-state design and the use of robust piezoelectric materials for the active parts of the sensor allows its operation at very high temperatures and pressures. Further advantages include low power consumption (on the order of several mW), and low cost.

The advantages of using RUS to monitor the resonance modes and thereby the pressure applied to the core may include: a high signal-to-noise ratio (about 92 dB) without signal averaging, use of narrow band tracking filter, and the ability to study any arbitrary frequency range with any desired frequency resolution. The absolute amplitude of the collected data is not important, so transducer quality is not a limiting consideration. In addition, data is directly collected in the frequency domain and may be interpreted using reduced or minimal signal processing.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The device, processor, and/or any other relevant devices or components according to embodiments of the present invention described herein may be implemented utilizing any suitable hardware, firmware (e.g. an application-specific integrated circuit), software, or a combination of software, firmware, and hardware. For example, the various components of the processor may be formed on one integrated circuit (IC) chip (e.g., a custom-designed ASIC—application specific integrated circuit) or on separate IC chips. Further, the various components of the processor may be implemented on a flexible printed circuit film, a tape carrier package (TCP), a printed circuit board (PCB), or formed on one substrate. Further, the various components of the processor may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the drawings, it will be understood by those of ordinary skill in the art that various changes in form and details may be made therein without departing from the spirit and scope as defined by the following claims and equivalents thereof.

What is claimed is:

1. A method of configuring a pressure sensor, comprising:
    transmitting a vibrational signal to a spherical core, the vibrational signal including a range of frequencies, thereby causing the spherical core to exhibit a resonance response at one or more frequencies within the range of frequencies;
    monitoring the spherical core for the resonance response according to a frequency response technique;
    applying a series of known pressure loads to the spherical core to generate a series of resonance spectra corresponding to the series of known pressure loads;
    identifying a peak shift in the series of resonance spectra; and
    correlating a magnitude of the peak shift with the series of known pressure loads to generate a calibration that can be used to characterize an unknown pressure load.

2. The method of claim 1, wherein the spherical core is hollow.

3. The method of claim 2, wherein the spherical core has a wall thickness of about 0.1 mm to about 5 mm.

4. The method of claim 1, wherein the transmitting a vibrational signal to the spherical core comprises sweeping a voltage signal from low to high or high to low frequency in a piezoelectric transducer.

5. The method of claim 1, wherein the known pressure loads and unknown pressure load are uniaxially applied.

6. The method of claim 1, wherein the known pressure loads and unknown pressure load are hydrostatically applied.

7. The method of claim 1, wherein the calibration is a standard curve.

8. The method of claim 7, wherein the standard curve is encoded as an equation generated by fitting the standard curve.

9. A method of measuring pressure, comprising:
    transmitting a vibrational signal to a spherical core, the vibrational signal including a range of frequencies, thereby causing the spherical core to exhibit a resonance response at one or more frequencies within the range of frequencies;
    monitoring the spherical core for the resonance response according to a frequency response technique;
    applying an unknown pressure load to the spherical core; and
    calculating the unknown pressure load by comparing the peak shift under the unknown pressure load to a calibration generated by applying a series of known pressure loads to the spherical core to generate a series of resonance spectra corresponding to the series of known pressure loads, identifying a peak shift in the series of resonance spectra, and correlating a magnitude of the peak shift with the series of known pressure loads.

10. The method of claim 9, wherein the spherical core is hollow.

11. The method of claim 10, wherein the spherical core has a wall thickness of about 0.1 mm to about 5 mm.

12. The method of claim 9, wherein the transmitting a vibrational signal to the spherical core comprises sweeping a voltage signal from low to high or high to low frequency in a piezoelectric transducer.

13. A sensor for measuring pressure, the sensor comprising:
    a spherical core;
    a transmitter configured to transmit vibrational signals to the spherical core; and
    a receiver on the opposite side of the spherical core from the transmitter, configured to receive the vibrational signals from the spherical core,
    wherein the vibrational signals cause the spherical core to resonate at a frequency that shifts under pressure, and the frequency shift is correlated to the pressure by comparison to a calibration.

14. The sensor of claim 13, wherein the spherical core is a hollow sphere.

15. The sensor of claim 14, wherein the spherical core has a wall thickness of about 0.1 mm to about 5 mm.

16. The sensor of claim 13, wherein the spherical core is a solid sphere.

17. The sensor of claim 13, wherein the spherical core is made of a metal selected from aluminum, steel, titanium, and tungsten.

18. The sensor of claim 13, wherein the transmitter and the receiver are piezoelectric transducers.

19. The sensor of claim 18, wherein the piezoelectric transducers are each made of lithium niobate.

20. A device for measuring pressure, the device comprising:
   the sensor of claim 13;
   a voltage signal generator coupled to the transmitter in the sensor by a first coaxial cable, the voltage signal generator being configured to drive the transmitter to transmit the vibrational signals to the spherical core;
   a frequency response spectrometer coupled to the receiver by a second coaxial cable, the frequency response spectrometer being configured to detect the frequency shift of the vibrational signals from the spherical core; and
   a processor coupled to the frequency response spectrometer, the processor being configured to identify the frequency shift and compare the frequency shift to the calibration.

* * * * *